United States Patent
Mizuno et al.

(10) Patent No.: US 10,431,351 B2
(45) Date of Patent: Oct. 1, 2019

(54) FLAT CABLE AND PRODUCTION METHOD THEREFOR

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Housei Mizuno, Yokkaichi (JP); Hiroki Hirai, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/042,133

(22) Filed: Jul. 23, 2018

(65) Prior Publication Data

US 2018/0330847 A1 Nov. 15, 2018

Related U.S. Application Data

(62) Division of application No. 15/037,472, filed as application No. PCT/JP2014/079469 on Nov. 6, 2014.

(30) Foreign Application Priority Data

Nov. 26, 2013 (JP) ................................. 2013-243658

(51) Int. Cl.
*H01B 13/00* (2006.01)
*H01B 7/24* (2006.01)
(Continued)

(52) U.S. Cl.
CPC ............. *H01B 7/0823* (2013.01); *H01B 7/24* (2013.01); *H01B 13/0016* (2013.01);
(Continued)

(58) Field of Classification Search
CPC ..... H01B 7/0823; H01B 7/24; H01B 13/0016
(Continued)

(56) References Cited

U.S. PATENT DOCUMENTS 3,004,229 A 10/1961 Stearns
3,395,244 A 7/1968 Koehler
(Continued)

FOREIGN PATENT DOCUMENTS

JP H05-11216 U 2/1993
JP H05-62527 A 3/1993
(Continued)

OTHER PUBLICATIONS

Jan. 13, 2015 International Search Report issued in International Patent Application No. PCT/JP2014/079469.
(Continued)

*Primary Examiner* — Timothy J Thompson
*Assistant Examiner* — Charles Pizzuto
(74) *Attorney, Agent, or Firm* — Oliff PLC

(57) ABSTRACT

A flat cable that includes a plurality of conductors respectively extending in an axial direction; and an insulating sheath configured to, in a state where the conductors are lined up in a width direction orthogonal to the axial direction of the conductors, restrict the conductors from outside and collectively cover the conductors, wherein the insulating sheath has an expander enabling bending in the width direction by permitting relative displacement between the conductors, and the expander, by expanding so as to partially separate from the conductors in at least a thickness direction orthogonal to both the width direction and the axial direc-
(Continued)

tion, forms an internal space permitting relative displacement such that adjacent conductors overlap in the thickness direction.

4 Claims, 10 Drawing Sheets

(51) Int. Cl.
 *H01B 7/08* (2006.01)
 *H02G 3/04* (2006.01)
 *B29L 31/00* (2006.01)
 *B29C 49/04* (2006.01)
(52) U.S. Cl.
 CPC ........ *B29C 49/04* (2013.01); *B29C 2791/006* (2013.01); *B29L 2031/755* (2013.01); *H02G 3/0468* (2013.01)
(58) Field of Classification Search
 USPC ...................................... 174/117 F
 See application file for complete search history.

(56) References Cited

U.S. PATENT DOCUMENTS

| | | |
|---|---|---|
| 3,800,068 A | 3/1974 | Torgerson |
| 4,237,334 A | 12/1980 | Kojima et al. |
| 4,467,138 A | 8/1984 | Brorein |
| 4,644,099 A | 2/1987 | Basconi |
| 4,675,470 A | 6/1987 | Hata et al. |
| 4,700,954 A | 10/1987 | Fischer |
| 4,801,764 A | 1/1989 | Ohlhaber |
| 5,340,330 A | 8/1994 | Dolson et al. |
| 5,351,973 A | 10/1994 | Taniuchi et al. |
| 5,473,723 A | 12/1995 | Stockman et al. |
| 5,596,175 A | 1/1997 | Ysbrand |
| 5,607,318 A | 3/1997 | Wakata et al. |
| 5,824,962 A | 10/1998 | Katsuma |
| 5,907,898 A | 6/1999 | Kunieda et al. |
| 5,915,056 A | 6/1999 | Bradley et al. |
| 6,201,191 B1 | 3/2001 | Yorita et al. |
| 6,265,668 B1 | 7/2001 | Liu |
| 6,434,306 B1 | 8/2002 | Ishikawa et al. |
| 6,436,557 B1 | 8/2002 | Moriuchi et al. |
| D466,867 S | 12/2002 | Krobusek |
| 6,509,526 B2 | 1/2003 | Osornio et al. |
| 6,872,888 B2 | 3/2005 | Santelli, Jr. |
| 6,962,506 B1 | 11/2005 | Krobusek |
| 7,211,731 B2 | 5/2007 | Nagamine et al. |
| 7,504,579 B2 | 3/2009 | Frank |
| 8,308,505 B2 | 11/2012 | Hatton et al. |
| 8,571,367 B2 | 10/2013 | Van Der Meulen et al. |
| 2004/0117964 A1 | 6/2004 | Pichler |
| 2005/0191910 A1 | 9/2005 | Bertini et al. |
| 2006/0124339 A1 | 6/2006 | Goehlich |
| 2010/0044071 A1 | 2/2010 | Murao et al. |
| 2010/0200268 A1 | 8/2010 | Suzuki et al. |
| 2010/0212935 A1 | 8/2010 | Cho et al. |
| 2016/0276063 A1* | 9/2016 | Mizuno .............. H01B 13/0016 |

FOREIGN PATENT DOCUMENTS

| | | |
|---|---|---|
| JP | 2000-314270 A | 11/2000 |
| JP | 2013-020750 A | 1/2013 |

OTHER PUBLICATIONS

Oct. 11, 2017 Office Action Issued in U.S. Appl. No. 15/037,472.
May 23, 2018 Office Action issued in U.S. Appl. No. 15/037,472.

* cited by examiner

FLAT CABLE AND PRODUCTION METHOD THEREFOR

BACKGROUND

This is a Division of U.S. application Ser. No. 15/037,472 filed May 18, 2016, which is a National Stage of International Application No. PCT/JP2014/079469 filed Nov. 6, 2014, which claims the benefit of Japanese Application No. 2013-243658 filed Nov. 26, 2013. The disclosures of the prior applications are hereby incorporated by reference herein in their entireties.

The present disclosurerelates to a flat cable configured to be routed in an automobile or the like, and a production method for that flat cable.

Conventionally, a flat cable is known as one type of cable having a plurality of conductors and an insulating sheath. In this flat cable, the plurality of conductors are arranged in a width direction orthogonal to an axial direction of the plurality of conductors, and the plurality of conductors extend parallel to each other. The insulating sheath collectively covers the conductors arranged in this way.

SUMMARY

Because the plurality of conductors are arranged in the width direction as described above, this flat cable has a flat shape as a whole, and particularly, has properties of being comparatively easily deflected in a thickness direction orthogonal to the above-mentioned width direction.

However, although the flat cable is easily deflected in the thickness direction, the flat cable is nearly unable to bend in the width direction in which the plurality of conductors are lined up. Therefore, the routing mode of the flat cable is considerably limited.

An exemplary aspect of the present disclosure provides a flat cable having a plurality of conductors arranged in a width direction and an insulating sheath that covers the conductors, the flat cable being bendable in both the thickness direction and the width direction of the flat cable, and a method whereby the flat cable can easily be produced.

The present inventors investigated causes of difficulty of bending in the width direction of a conventional flat cable. A reason that it is difficult to bend a conventional flat cable in the width direction is that the arranging mode of the plurality of conductors is fixed. That is, in a conventional flat cable each conductor is restricted by the insulating sheath so the arranging mode of the conductors is fixed, and therefore in order to bend the flat cable in the width direction, it is necessary to have a large difference between the length of a conductor positioned inside in the width direction, i.e., the small side in the bending radius of the flat cable, and the length of a conductor positioned outside in the width direction, i.e., the large side in the bending radius. However, elasticity of the conductors is extremely limited, so it is not possible to provide a large difference in the lengths of these conductors.

The present disclosure was made from such a point of view. The flat cable provided by the present disclosure includes a plurality of conductors respectively extending in an axial direction, and an insulating sheath configured to, in a state where the conductors are lined up in a width direction orthogonal to the axial direction of the conductors, restrict the conductors from outside and collectively cover the conductors. The insulating sheath has an expander enabling bending in the width direction by permitting relative displacement between the conductors. The expander, by expanding so as to partially separate from the conductors in at least a thickness direction orthogonal to both the width direction and the axial direction, forms an internal space permitting relative displacement such that conductors adjacent to each other overlap in the thickness direction.

Here, the meaning of "conductors adjacent to each other overlap in the thickness direction" is not limited to a mode where these conductors completely overlap each other in the thickness direction, and also includes a mode where when viewed from the thickness direction, certain portions of both conductors partially overlap each other.

Also, the present disclosure provides a method for producing the flat cable. This method includes preparing a flat cable material having a plurality of conductors respectively extending in an axial direction, and an insulating sheath composed of a thermoplastic resin material and configured to, in a state where the conductors are lined up in a width direction orthogonal to the axial direction of the conductors, restrict the conductors from outside and collectively cover the conductors; arranging a die, having an inner face with an expander having a shape expanding to the outside in a radial direction relative to an outer circumferential face of the flat cable material, around the circumference of a location of at least part of the flat cable material in the axial direction; and by heating the thermoplastic resin material composing the insulating sheath to soften the thermoplastic resin material within the die and conferring a pressure difference such that pressure inside of the insulating sheath becomes higher than pressure outside of the insulating sheath within the die, forming, in the insulating sheath, the expander having a shape following the inner face of the die, the expander, by expanding so as to partially separate from the conductors in a thickness direction orthogonal to the width direction and the axial direction, forming an internal space permitting relative displacement such that conductors adjacent to each other overlap in the thickness direction.

Here, "heating the thermoplastic resin material to soften the thermoplastic resin material" means heating the thermoplastic resin material to soften the thermoplastic resin material such that by conferring the pressure difference, the thermoplastic resin expands and becomes deformable to a shape following an uneven inner face of the die, and it is sufficient that the specific heating temperature is set as appropriate according to the material and thickness of the thermoplastic resin.

DETAILED DESCRIPTION OF EMBODIMENTS

Figure 1:
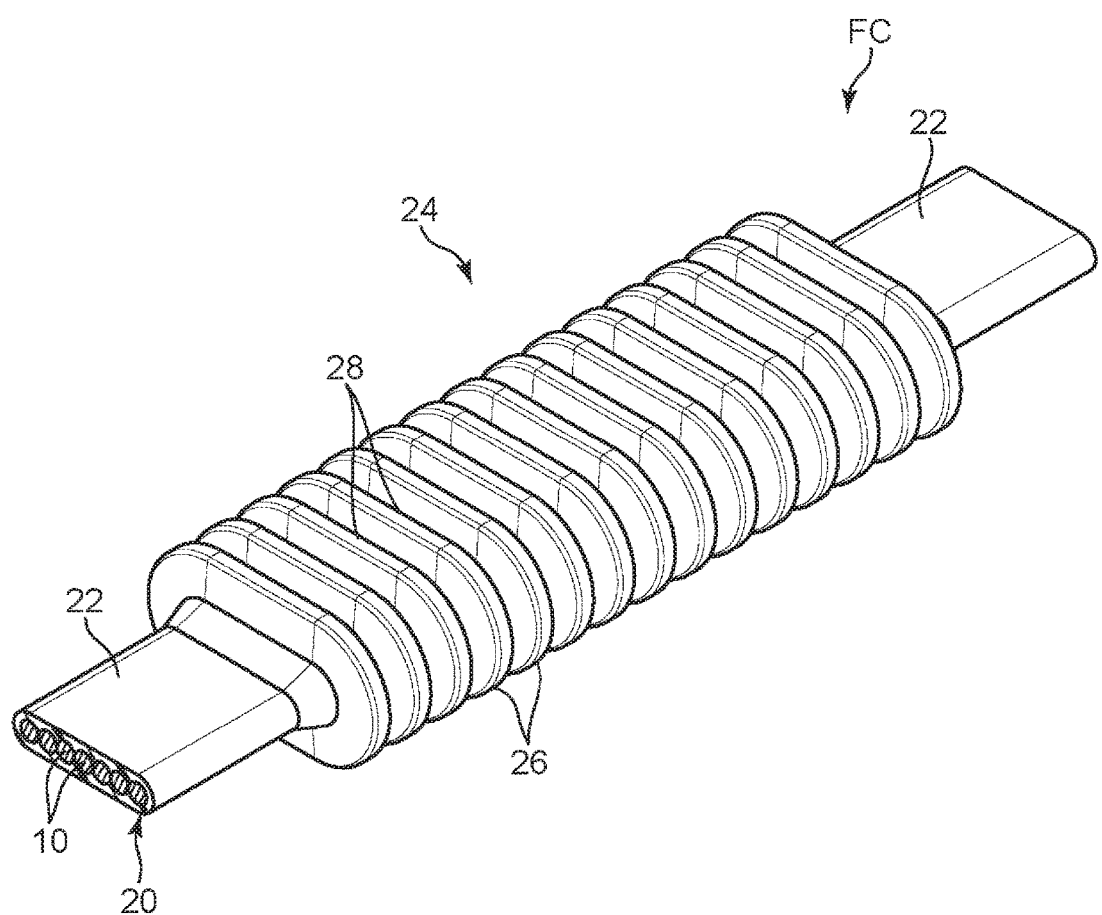
FIG. 1 is a cross-sectional perspective view showing principal portions of a flat cable according to a first embodiment of the present invention.
Figure 2:
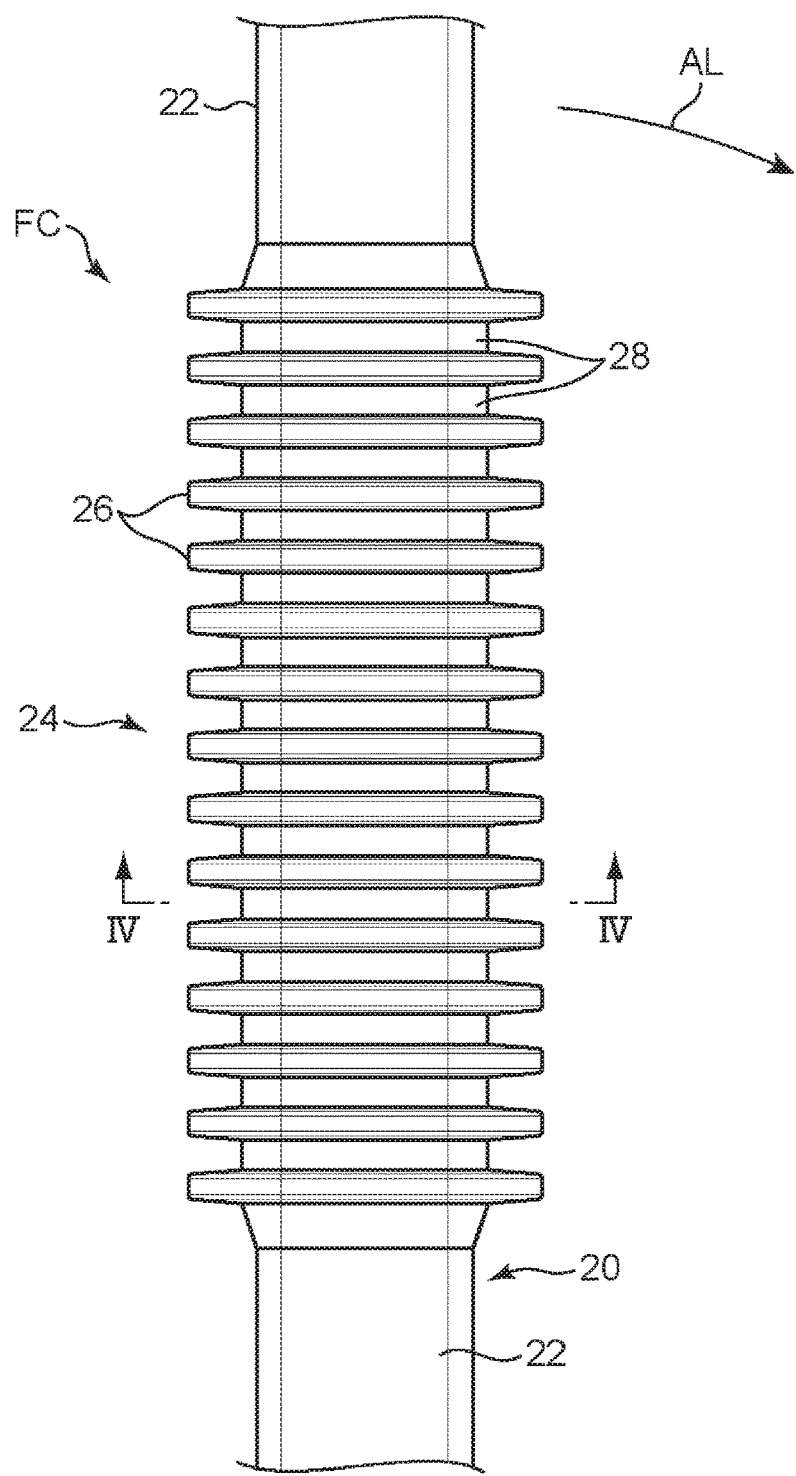
FIG. 2 is a plan view showing principal portions of the flat cable.

Preferred embodiments of the present disclosure will be described with reference to the drawings.

FIGS. 1 to 4B show a flat cable FC according to a first embodiment of the present invention. This flat cable FC is provided with a plurality of conductors 10 and an insulating sheath 20 that covers the conductors 10. The conductors 10 may be any conductors having high conductivity, and for example, are each configured from a single wire strand or a plurality of wire strands bundled to each other, the wire being composed of a metal material having good conductivity such as copper. The insulating sheath 20 has a shape that collectively covers the conductors 10 in a state with the conductors arranged parallel to each other and lined up in a direction orthogonal to an axial direction of the conductors 10, that is, the insulating sheath 20 has a flat shape. The insulating sheath 20 is composed of a synthetic resin material having insulating properties. The specific material is not particularly limited, but it is desirable for that material to be thermoplastic resin in order to perform production of the flat cable FC in the manner described later.

This flat cable FC is characterized by the insulating sheath 20 having an expansion portion 24 (i.e., expander) at a location in part of the insulating sheath 20 in the axial direction. The expansion portion 24 has a shape that expands in a width direction and in a thickness direction orthogonal to the width direction, relative to a portion other than the expansion portion 24 within the insulating sheath 20, that is, relative to a normal portion 22 where an inner circumferential face of the insulating sheath 20 closely contacts or approximately closely contacts an outer circumferential face of the center conductors 10. Specifically, the expansion portion 24 expands so as to separate to the outside in the thickness direction from the outer circumferential face of the conductors 10, and separate to the outside in the width direction from the outer circumferential face of the conductors 10 positioned at both outer sides in the width direction among the conductors 10.

The expansion portion 24 according to this first embodiment is further characterized by having a bellows-like shape, that is, a shape in which a plurality of large-diameter portions, i.e., mountain portions 26, and a plurality of small-diameter portions, i.e., valley portions 28, are lined up alternately in the axial direction. The mountain portions 26 have a shape that expands to the outside in a radial direction such that the inner circumferential face of the mountain portions 26 separates greatly to the outside in the radial direction from the outer circumferential face of the center conductors 10. On the other hand, the valley portions 28 have an outer diameter smaller than the outer diameter of the mountain portions 26, and an inner diameter smaller than the inner diameter of the mountain portions 26. That is, the expansion portion 24 according to this embodiment has a shape such that its inner diameter and outer diameter repeatedly increase and decrease with respect to the axial direction.

Figure 3:
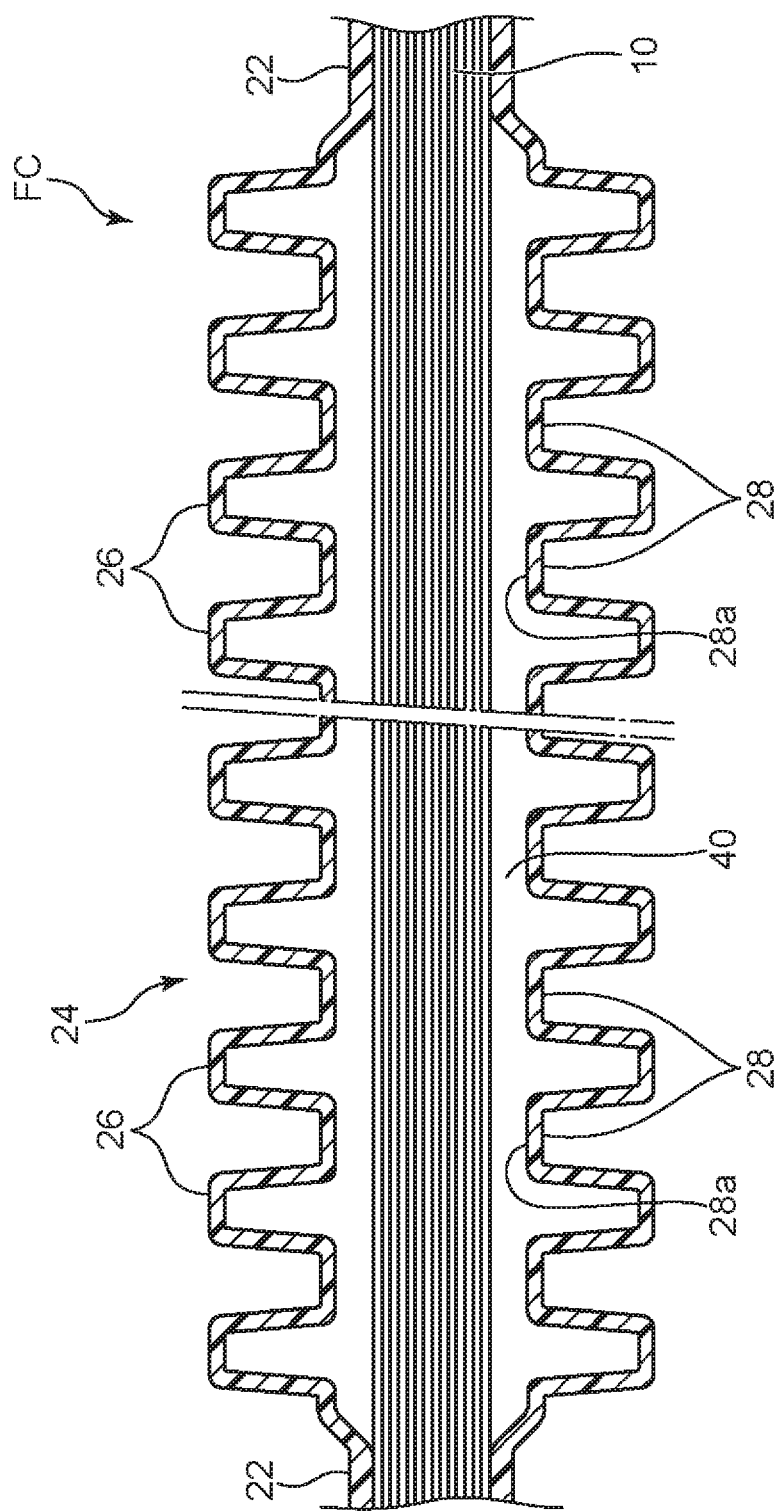
FIG. 3 is a cross-sectional front view showing principal portions of the flat cable.
Figure 4A:
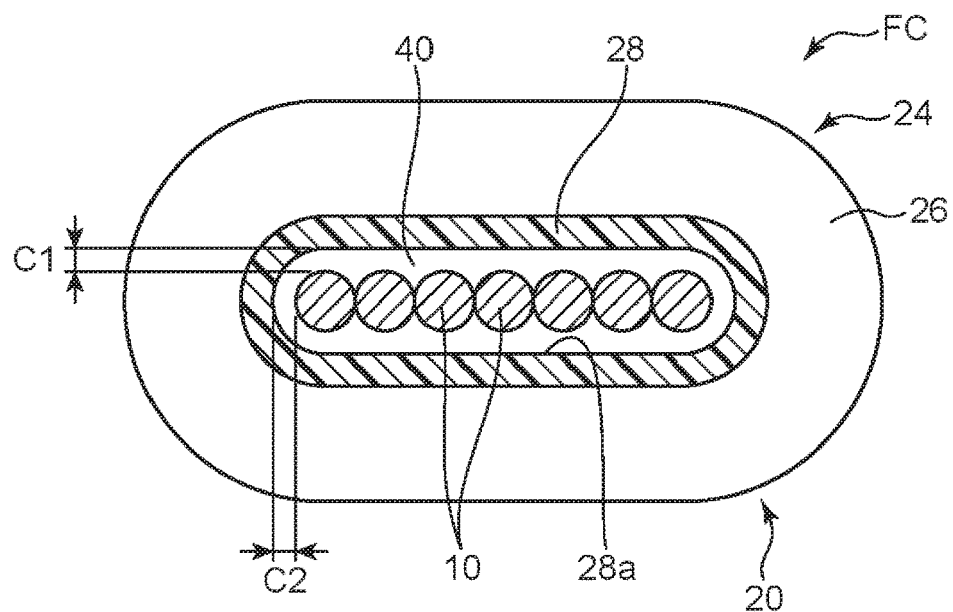
FIG. 4A is a cross-sectional view taken along line IV-IV in FIG. 2.
Figure 4B:
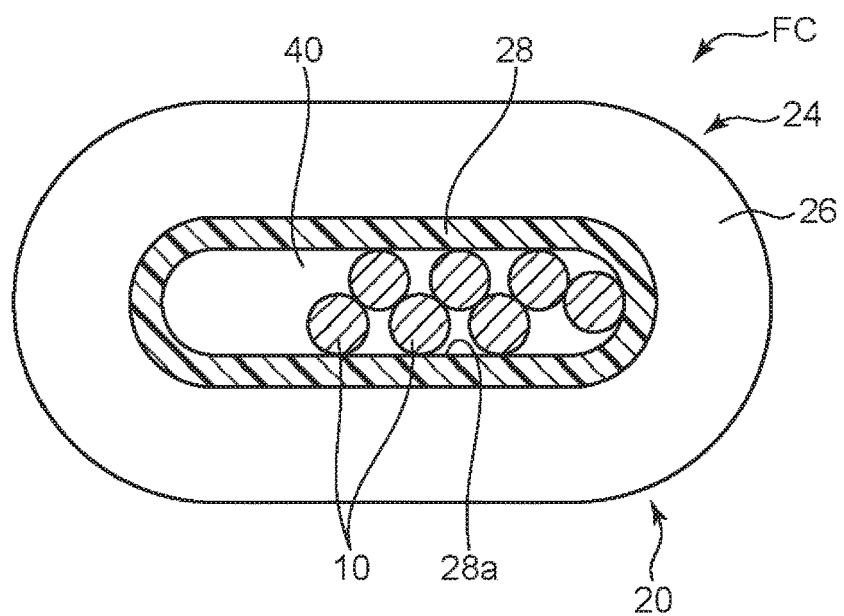
FIG. 4B is a cross-sectional view showing a state in which the flat cable has been bent in a width direction from the state in FIG. 4A.

Accordingly, in the expansion portion 24 according to this first embodiment, as shown in FIGS. 3-4B, between an inner circumferential face 28a of the valley portions 28 and the conductors 10, a gap is formed in the thickness direction and the width direction, and thus, a space 40 that permits the conductors 10 to be displaced relative to each other is formed inside the expansion portion 24.

This space 40, by permitting the relative displacement, enables the flat cable FC to easily bend in the expansion portion 24. For example, with a conventional flat cable, i.e., with a flat cable in which the conductors and the insulating sheath closely contact each other throughout the entire area in the axial direction and so relative displacement between conductors is not permitted, when attempting to bend this flat cable in the width direction, it is necessary to provide a difference between a path length of a conductor positioned to the inside in the bending direction and the path length of a conductor positioned to the outside, but the amount that the conductors can elastically expand or contract in order to produce this difference is small, and therefore it is difficult in reality to bend the flat cable in the width direction. On the other hand, when attempting to bend the flat cable FC according to the first embodiment in, for example, the width direction as indicated by arrow AL in FIG. 2, as shown in FIG. 4B, conductors 10 that are adjacent to each other can overlap in the thickness direction (the vertical direction in FIG. 4B)), so that the entire conductors 10 can be unevenly distributed to the inside in the bending direction (to the right side in FIG. 4B)). This enables bending in the width direction of the flat cable FC in the expansion portion 24.

Here it possible to freely set a size C1 of the gap in the thickness direction between the conductors 10 and the inner circumferential face 28a of the valley portion 28 shown in FIG. 4A, and a size C2 of the gap in the width direction between the conductors 10 at both outer sides in the width direction and the inner circumferential face 28a. By setting a larger size C1 of the gap in the thickness direction it is possible to increase the degree of overlapping in the thickness direction between conductors 10 that are adjacent to each other, and by setting a larger size C2 of the gap in the width direction it is possible to increase the degree of uneven distribution of the entire conductors 10 to the inside in the bending direction within the expansion portion 24. Accordingly, both the size C1 and the size C2 can contribute to an improvement in easy bending in the expansion portion 24.

In the present invention, the gap in the width direction may be omitted, or only the gap in the thickness direction may be secured. In this case as well, by enabling conductors 10 that are adjacent to each other to overlap in the thickness direction, easy bending of the flat cable FC is markedly improved.

Further, with the flat cable FC according to this first embodiment, the expansion portion 24 has a so-called bellows shape alternately having the plurality of mountain portions 26 and the plurality of valley portions 28, so flexural rigidity of the expansion portion 24 itself also is less than the flexural rigidity of the other normal portion 22. That is, with the expansion portion 24, it is possible to easily cause bending deformation of the insulating sheath 20 itself.

The flat cable FC described above can be produced logically and easily by a method including the following steps, for example.

1) Preliminary Step (Flat Cable Material Preparation Step)

In this step, ordinary (that is, such that thickness and diameter of the insulating sheath 20 are uniform) flat cable material having the center conductors 10 and the insulating sheath 20 is prepared. This flat cable material can be manufactured by extrusion molding for example, in the same manner as an ordinary insulated wire. In order to perform molding in a heated state later, resin that has insulating properties and thermoplastic properties is used as the material of the insulating sheath 20. Specifically, it is suitable to use polyamide resin, polypropylene resin, polyethylene resin, polyethylene-terephthalate resin, crosslinked polyethylene, ethylene-ethyl acrylate copolymer resin, thermoplastic polyurethane copolymer resin, vinyl chloride, or the like.

2) Die Arranging Step and Expansion Portion Forming Step

In these steps, a die for forming the expansion portion 24 is arranged around the circumference of a location in at least part of the flat cable material in the axial direction, and in that state the expansion portion 24 is formed. In other words, at least part of the flat cable material in the axial direction is arranged inside the die, and the expansion portion 24 is formed inside the die. Formation of the expansion portion 24 is performed by conferring a pressure difference between the inside pressure and the outside pressure (i.e. pressure within the die) of the insulating sheath 20 at the forming location of the expansion portion 24, such that the inside pressure is higher. For example, the following vacuum molding is suitable for formation of the expansion portion 24 utilizing this sort of pressure difference.

Figure 5:
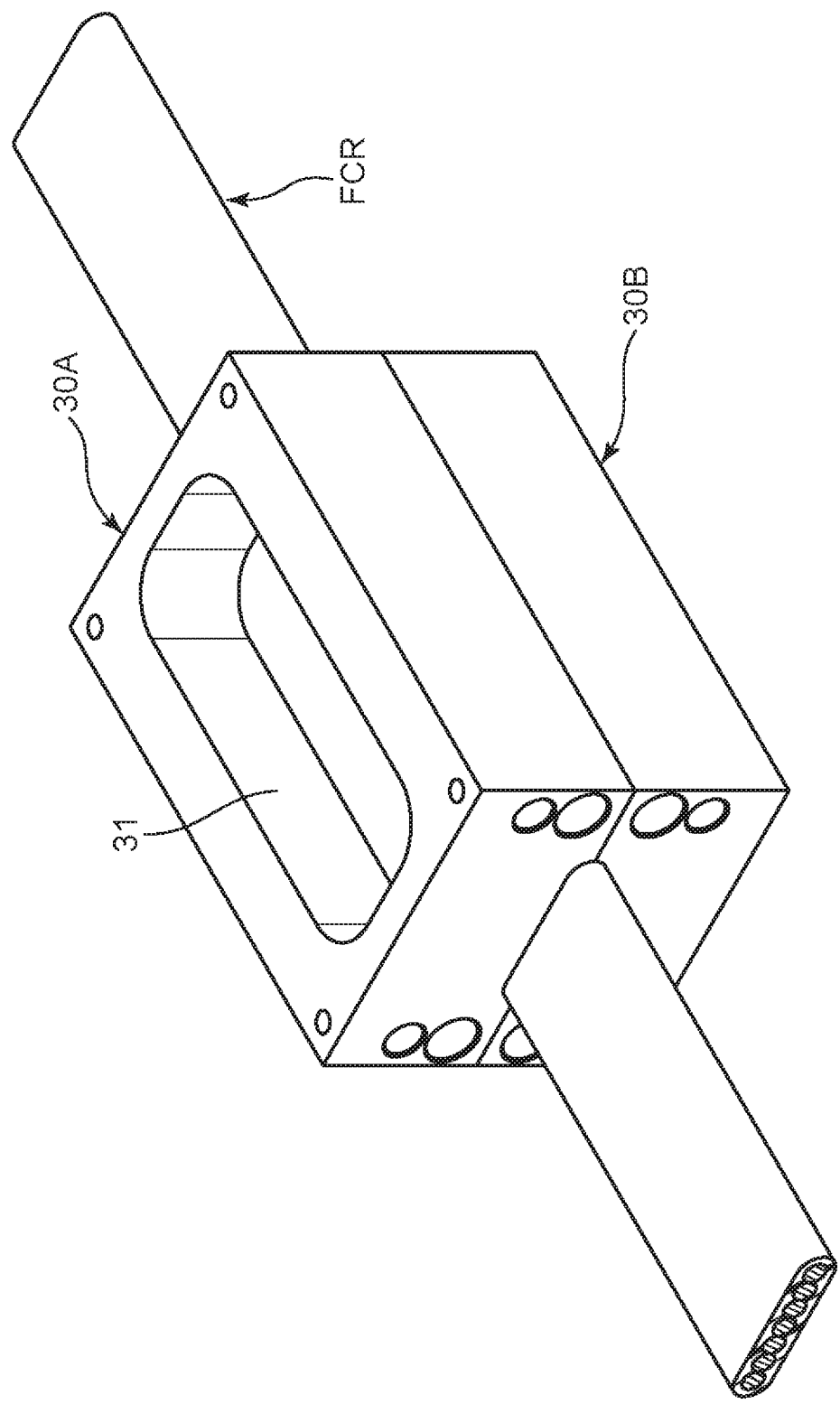
FIG. 5 is a perspective view showing a state in which a lower die and an upper die for forming an expansion portion of the flat cable by vacuum molding have been arranged around the circumference of the flat cable.
Figure 6:
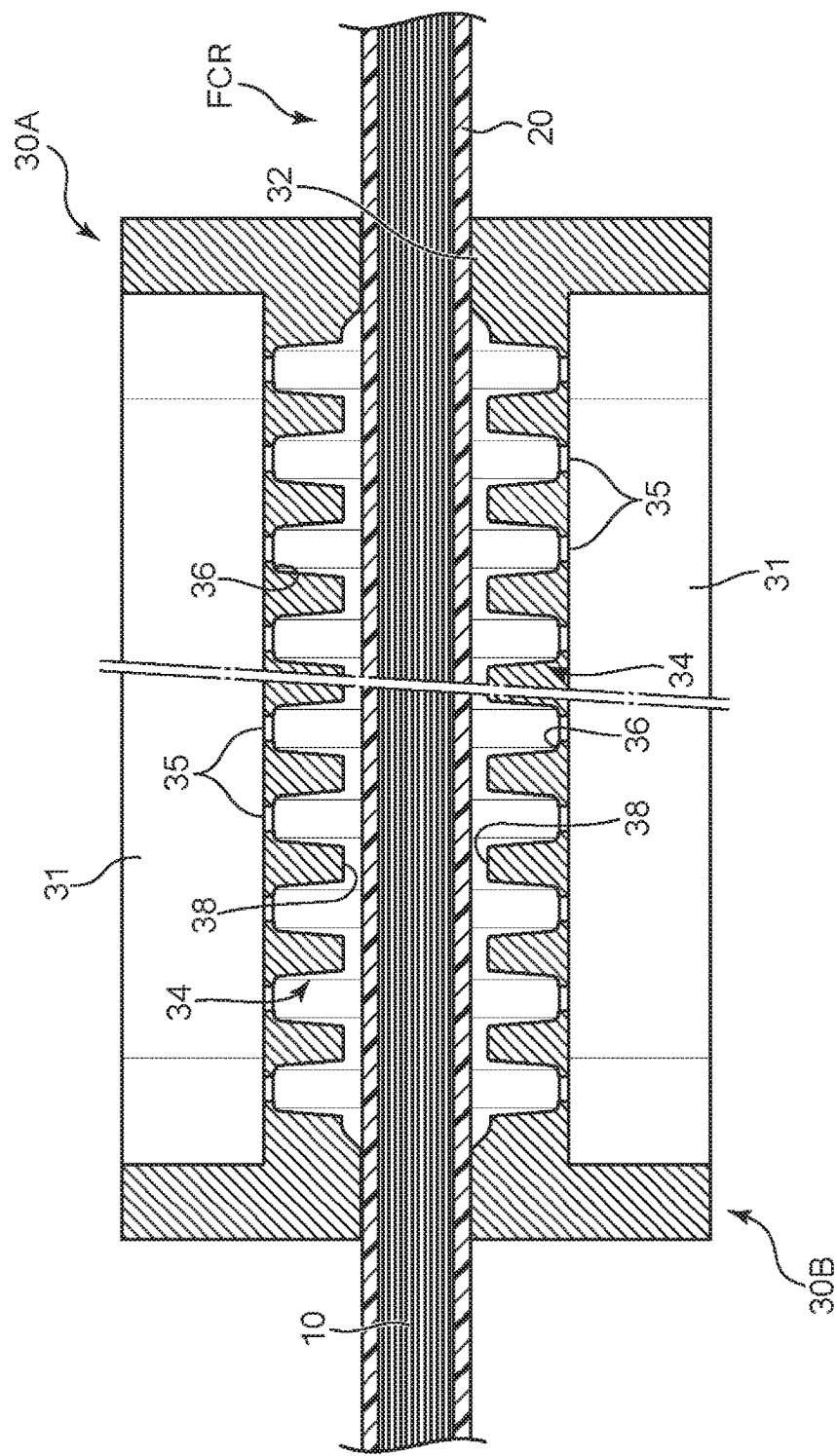
FIG. 6 is a cross-sectional front view showing a state in which the lower die and the upper die have been arranged around the circumference of the flat cable.
Figure 7:
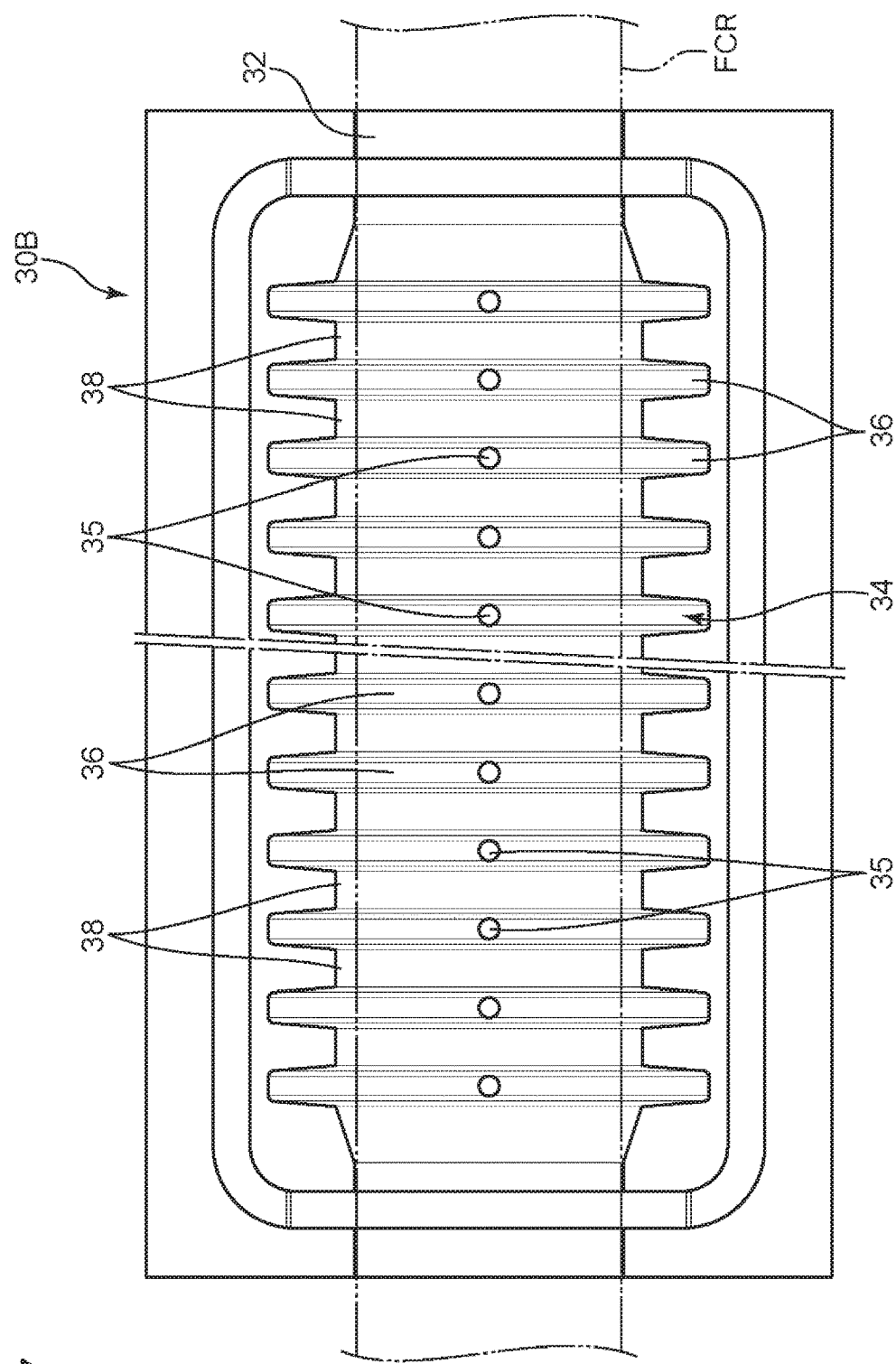
FIG. 7 is a plan view of the lower die.

In this vacuum molding, the pressure difference is formed by reducing the pressure of the space outside of the insulating sheath 20, and is realized using, for example, an upper die 30A and a lower die 30B as shown in FIGS. 5 and 6 (only the lower die 30B is shown in FIG. 7).

The upper die 30A and the lower die 30B have a shape that sandwiches, from above and below, only an expansion portion forming location and the vicinity thereof within the flat cable material FCR shown in FIGS. 5 and 6. Specifically, both end portions in the axial direction of both dies 30A and 30B respectively have a half-inner circumferential face 32 that is semi-circular in its cross-section and corresponds to the outer circumferential face of the flat cable material FCR, and a portion in the center in the axial direction has an uneven inner face 34 with a shape corresponding to the outer face shape of the expansion portion 24 to be formed. That is, this uneven inner face 34 has large diameter portions 36 having a size corresponding to the outer circumferential face of the mountain portions 26 and that expand outward in the radial direction, and small diameter portions 38 having an inner diameter corresponding to the outer circumferential face of the valley portion 28. The shape of the inner circumferential face of the small diameter portions 38 is set to a shape with a size larger than the outer circumferential face of the insulating sheath 20 of the flat cable material FCR, such that the space 40 is secured inside of the expansion portion 24 to be formed.

A recessed portion 31, which is a portion configured to be connected to a vacuum pump not shown in the drawings, is formed in the outside face of each die 30A and 30B, and a plurality of air suction holes 35 are formed in each die 30A and 30B such that a bottom face of the recessed portion 31 is in communication with a plurality of locations of the inside face 32 (in the example shown in FIGS. 6 and 7, the large diameter portions 36 that correspond to the mountain portions 26, i.e., inner faces that expand greatly outward in the radial direction). Accordingly, the vacuum pump can be connected to the air suction holes 35.

When performing vacuum molding, the flat cable material FCR is sandwiched between both dies 30A and 30B such that in the upper die 30A and the lower die 30B, the inner circumferential faces 32 that were formed at both ends in the axial direction of the dies 30A and 30B each closely contact the entire circumference of the outer circumferential face of the flat cable material FCR (the outer circumferential face of the insulating sheath 20), and in this state both dies 30A and 30B are joined to each other with a bolt not shown in the drawings. In other words, both of the dies 30A and 30B are arranged around the circumference of the flat cable material FCR.

In this state, the thermoplastic resin of which the insulating sheath 20 is composed is heated by a heater built into the dies 30A and 30B, for example. It is sufficient that the temperature of this heating is set such that by contribution of the pressure difference described below, the thermoplastic resin expands and softens enough to be deformable to a shape that follows the uneven inner face 34 of the dies 30A and 30B, and it is sufficient that the specific value of that temperature is set as appropriate according to the material and thickness of the thermoplastic resin. For example, in a case where the material of the insulating sheath 20 is vinyl chloride with a thickness of about 1 mm, it is sufficient to heat to a temperature of about 100 to 130° C. That is, it is sufficient that the heating temperature of the thermoplastic resin is set such that the insulating sheath 20 composed of this thermoplastic resin softens enough to be deformable to a shape corresponding to the uneven inner face 34, and that specific temperature is not limited.

In this sort of heated state, further, the vacuum pump operates to form a negative pressure by sucking out air from inside of the upper die 30A and the lower die 30B. Thus, a pressure difference (=Pi−Po) of Po<Pi (=atmospheric pressure) between a pressure Po of the air within the dies 30A and 30B (that is, the pressure of air immediately outside of the insulating sheath 20) and a pressure Pi inside of the insulating sheath 20 is conferred. This pressure difference causes the insulating sheath 20 that was heated and softened within the dies 30A and 30B to change to a shape that closely contacts the inside face of the dies 30A and 30B, that is, a shape having the mountain portions 26 and the valley portions 28 corresponding to the uneven inner face 34 where the large diameter portions 36 and the small diameter portions 38 are alternately lined up. Thus, the expansion portion 24 is formed including the mountain portions 26 and the valley portions 28, and with less thickness than the normal portion 22. In this way, the flat cable FC having the expansion portion 24 is produced.

Note that in a case where the insulating sheath 20 has low elasticity and so it is difficult for the insulating sheath 20 to closely contact the die inner circumferential faces 32, a seal member, such as an O ring for example, may be sandwiched between the insulating sheath 20 and the die inner circumferential faces 32. Also, a rubber sheet may be sandwiched between the dies 30A and 30B in order to seal the joining face between the dies 30A and 30B. Alternatively, in a case where the flat cable material FCR is comparatively short, a long die may be used such that the entire flat cable material FCR is sealed. In this case as well, when air is evacuated from within the die to reduce pressure, a pressure difference of Po<Pi (=atmospheric pressure) occurs between the inside pressure Pi of the insulating sheath 20 and the outside pressure Po due to channel resistance at the center conductors 10 in the flat cable material FCR, so the expansion portion 24 can be formed in the same manner as described above.

Other than this sort of vacuum molding, the pressure difference can also be conferred by blow molding. With this blow molding, a pressure difference of Po (=atmospheric pressure) <Pi is formed by injecting a pressurized gas (for example, air) into the insulating sheath 20 to elevate the inside pressure Pi.

According to the production method described above, it is possible to form a suitable expansion portion 24 in the insulating sheath 20 simply by arranging a die having an inner face with an appropriate shape around the circumference of the flat cable material FCR and conferring a pressure difference between the inside and the outside of the insulating sheath 20 while heating the insulating sheath 20 within the die. With this method, the shape of the die inner face corresponds to the shape of the obtained expansion portion 24, so by setting the shape of the inner face of the die, the expansion portion 24 can be freely formed with a desirable shape. In other words, formation of an expansion portion having a required shape can easily be attained by using a die having a shape that corresponds to that required shape.

Figure 8A:
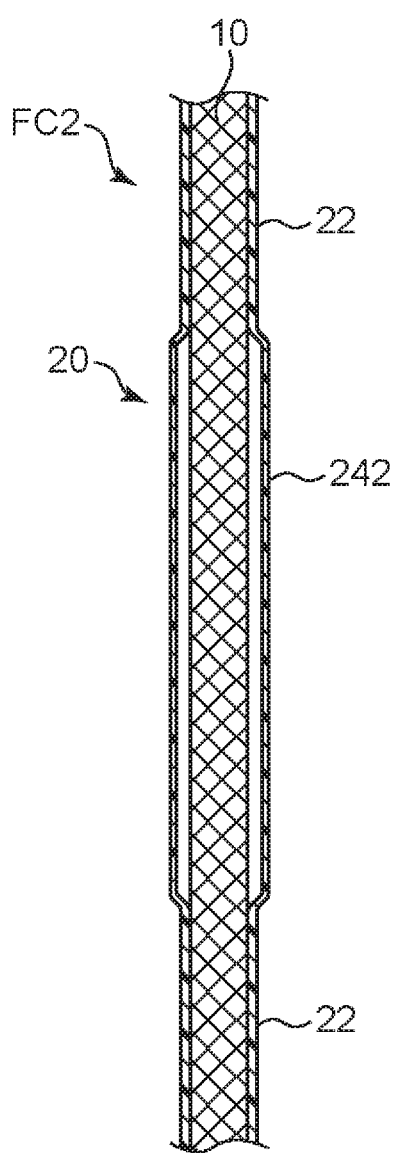
FIG. 8A is a cross-sectional front view of a flat cable according to a second embodiment of the present invention.
Figure 8B:
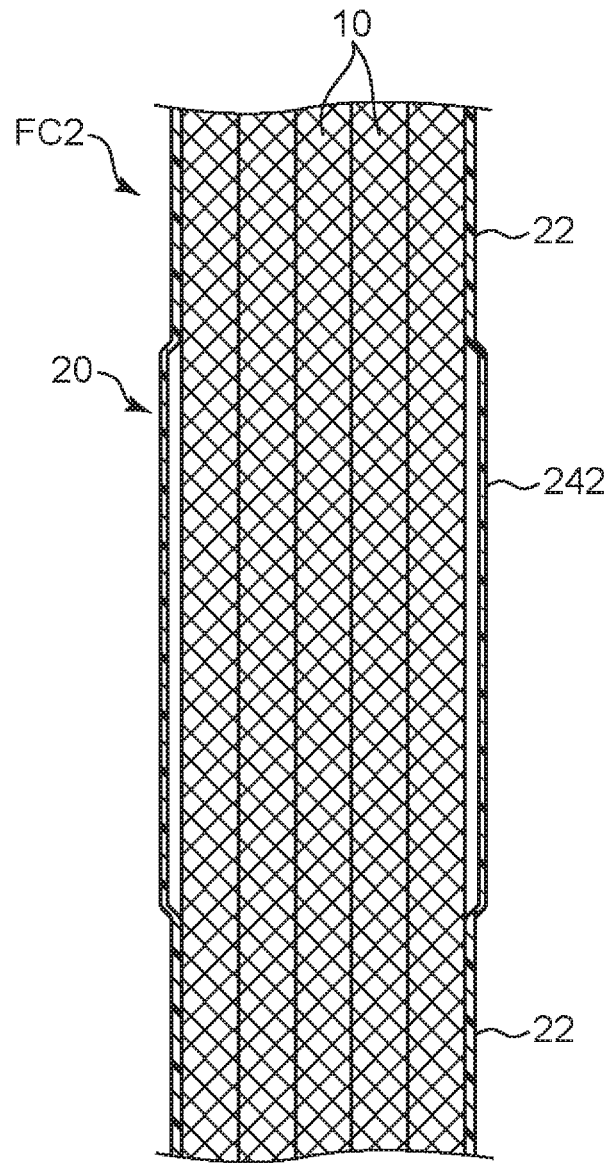
FIG. 8B is a cross-sectional plan view of that flat cable.

In the present invention, the specific shape of the expansion portion is not limited. FIGS. 8A and 8B show a flat cable FC2 according to a second embodiment. This flat cable FC2 has an expansion portion 242 with a flat shape rather than a bellows-like shape. That is, this expansion portion 242 has a cross-sectional shape with a size larger than the other normal portion 22 and is separated from the inside conductors 10 to the outside in the thickness direction and in the width direction, and has a uniform cross-sectional shape in the axial direction. In this sort of expansion portion 242 as well, it is possible to rapidly improve the ease of bending in the expansion portion 242 by permitting the plurality of conductors 10 inside of the expansion portion 242 to be displaced relative to each other.

Also, in a case where the expansion portion has a plurality of mountain portions such as the mountain portions 26, the shape of the mountain portions is not limited to a ring-like shape as shown in FIG. 1.

Figure 9:
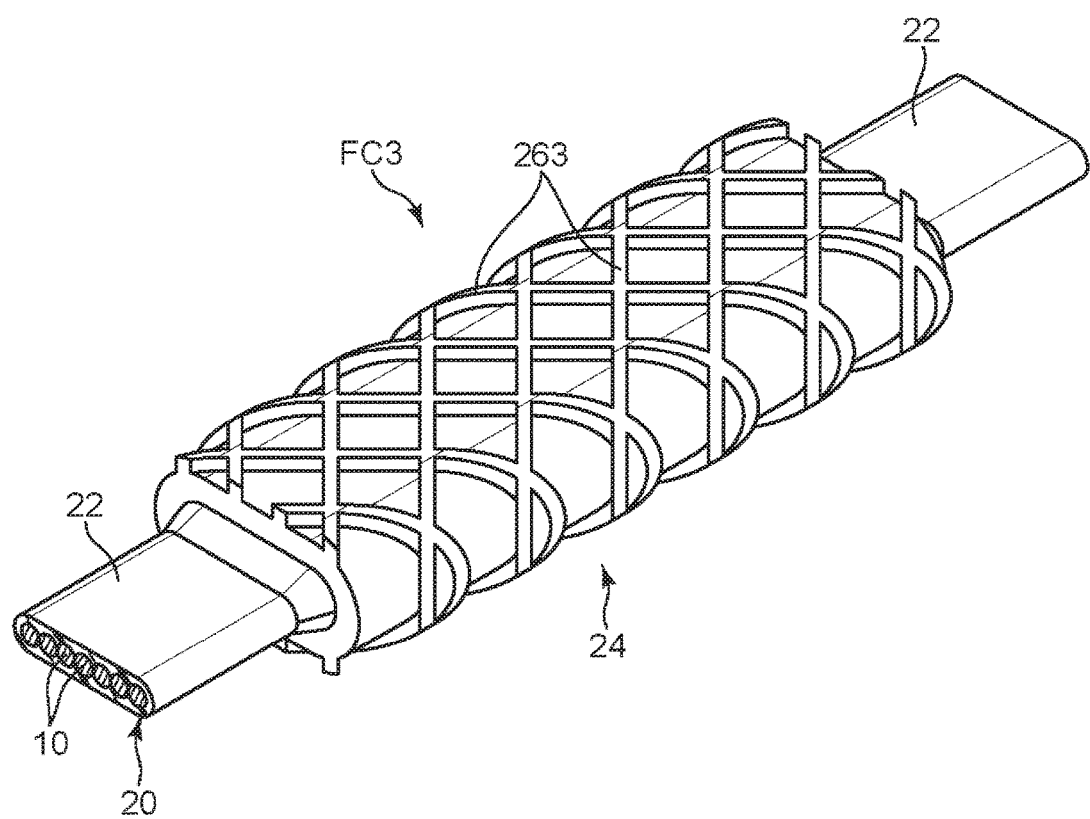
FIG. 9 is a cross-sectional perspective view showing principal portions of a flat cable according to a third embodiment of the present invention.

For example, the mountain portions may be formed in a web-like shape like mountain portions 263 of a flat cable FC3 shown in FIG. 9 as a third embodiment, or may be formed in a spiral-like shape.

Figure 10:
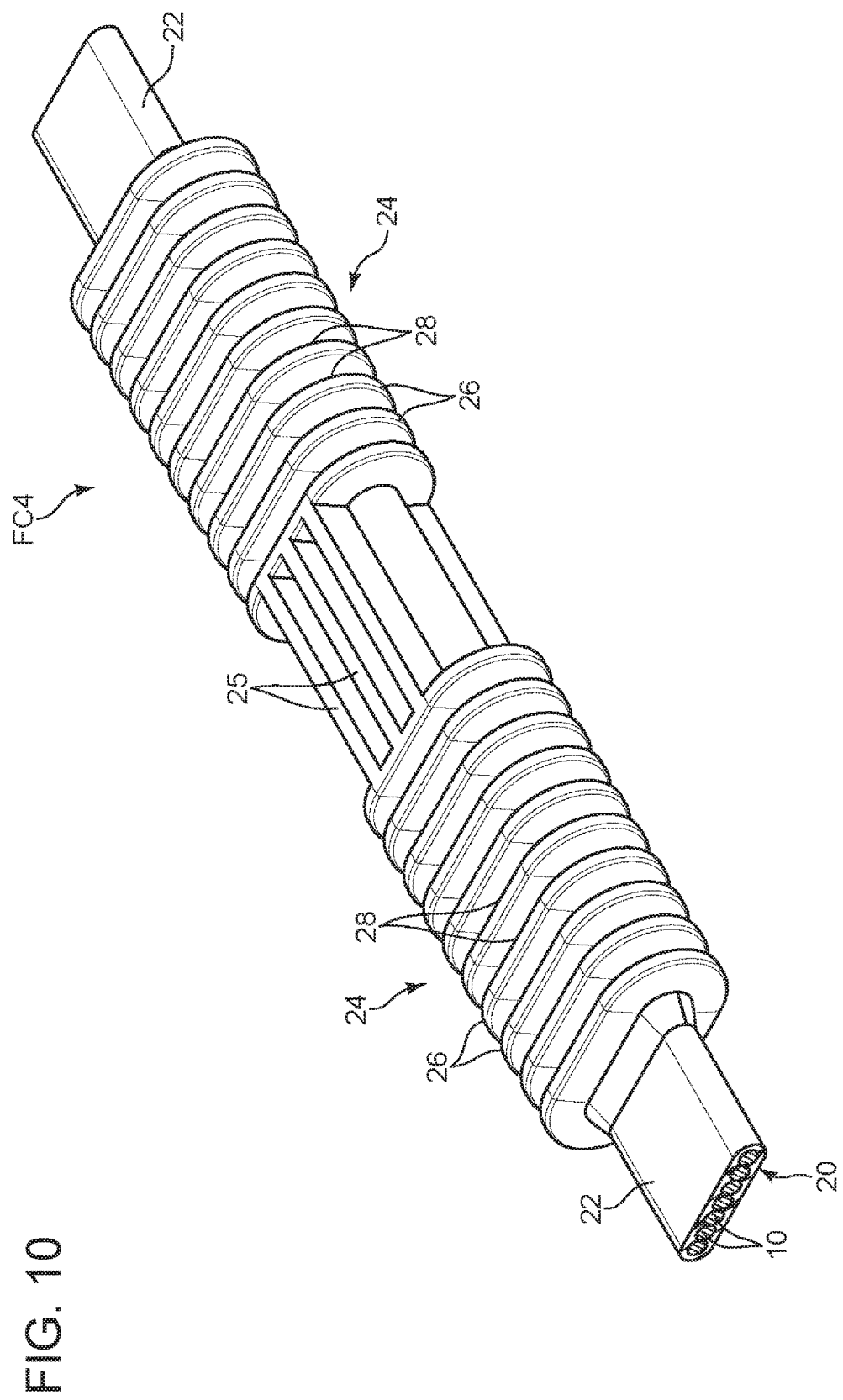
FIG. 10 is a cross-sectional perspective view showing principal portions of a flat cable according to a fourth embodiment of the present invention.

In the present embodiment, the quantity of expansion portions, and the shape of the insulating sheath in a portion other than the expansion portion, are not particularly limited. FIG. 10 shows a flat cable FC4 according to a fourth embodiment, and the insulating sheath 20 of this flat cable FC4 has a plurality of expansion portions 24 lined up intermittently in the axial direction, with a plurality of ribs 25 formed between particular expansion portions 24 of those lined up. These ribs 25 extend in a direction parallel to the axial direction, and converse to the expansion portion 24, prevent the flat cable FC4 from deforming by bending in the thickness direction in a portion where the ribs 25 are formed.

As described above, the present disclosure provides a flat cable having a plurality of conductors arranged in a width direction and an insulating sheath that covers the conductors, the flat cable being capable of bending in both the width direction and a thickness direction, and also provides a method capable of easily producing that flat cable.

The flat cable provided by the present disclosure includes a plurality of conductors respectively extending in an axial direction, and an insulating sheath configured to, in a state where the conductors are lined up in a width direction orthogonal to the axial direction of the conductors, restrict the conductors from outside and collectively cover the conductors. The insulating sheath has an expansion portion enabling bending in the width direction by permitting relative displacement between the conductors. The expansion portion, by expanding so as to partially separate from the conductors in at least a thickness direction orthogonal to both the width direction and the axial direction, forms an internal space permitting relative displacement such that conductors adjacent to each other overlap in the thickness direction.

Here, the meaning of "conductors adjacent to each other overlap in the thickness direction" is not limited to a mode where these conductors completely overlap each other in the thickness direction, and also includes a mode where when viewed from the thickness direction, certain portions of both conductors partially overlap each other.

With this flat cable, restriction of each conductor by the insulating sheath is released locally in the expansion portion within the insulating sheath, and in the expansion portion, i.e., the portion that expands such that the insulating sheath separates from the conductors in at least the thickness direction, a space is formed that permits conductors to overlap each other in the thickness direction inside of the insulating sheath, so along with relative displacement between those conductors, it is possible to bend the flat cable not only in the thickness direction, but also in the width direction. That is, when bending in the expansion portion, conductors positioned to the side of the larger bending radius, i.e. positioned to the outside, are permitted to be displaced to the inside relative to conductors positioned to the side of the smaller bending radius, i.e. positioned to the inside, and permission of this relative displacement facilitates bending in the expansion portion.

More preferably, the expansion portion further expands so as to separate to the outside in the width direction from an outer circumferential face of conductors positioned at both outer sides in the width direction. By adopting such a configuration, a gap formed between the expansion portion and conductors positioned outside in the width direction, when the flat cable has been bent in the width direction, enables the conductors to be relatively displaced to the inside (the small side in the bending radius) in that bending direction relative to the expansion portion, that is, enables the conductors to take the shortest path possible, and thus bending in the expansion portion can occur more easily.

The specific shape of the expansion portion is not particularly limited. However, the expansion portion more preferably has a bellows-like shape with a mountain portion configured to expand to the outside, and a valley portion having a smaller outer diameter than the outer diameter of the mountain portion and an inner diameter smaller than the inner diameter of the mountain portion, alternately lined up. This shape not only permits relative displacement between the conductors, but also facilitates bending deformation of the insulating sheath itself, and thus it is possible to further increase the degree of bending deformation that is possible for the expansion portion.

Also, the method provided by the present disclosure includes a step of preparing a flat cable material having a plurality of conductors respectively extending in an axial direction, and an insulating sheath composed of a thermoplastic resin material and configured to, in a state where the conductors are lined up in a width direction orthogonal to the axial direction of the conductors, restrict the conductors from outside and collectively cover the conductors; a step of arranging a die, having an inner face with an expansion portion having a shape expanding to the outside in a radial direction relative to an outer circumferential face of the flat cable material, around the circumference of a location of at least part of the flat cable material in the axial direction; and a step of, by heating the thermoplastic resin material composing the insulating sheath to soften the thermoplastic resin material within the die and conferring a pressure difference such that pressure inside of the insulating sheath becomes higher than pressure outside of the insulating sheath within the die, forming, in the insulating sheath, an expansion portion having a shape following the inner face of the die, the expansion portion, by expanding so as to partially separate from the conductors in a thickness direction orthogonal to the width direction and the axial direction, forming an internal space permitting relative displacement such that conductors adjacent to each other overlap in the thickness direction.

Here, "heating the thermoplastic resin material to soften the thermoplastic resin material" means heating the thermoplastic resin material to soften the thermoplastic resin material such that by conferring the pressure difference, the thermoplastic resin expands and becomes deformable to a shape following the uneven inner face of the die, and it is sufficient that the specific heating temperature is set as appropriate according to the material and thickness of the thermoplastic resin.

According to this flat cable production method, a suitable expansion portion can be formed in an insulating sheath by arranging a die around the circumference of a flat cable material and, while heating the insulating sheath in the die, conferring a pressure difference inside and outside of the insulating sheath. By this method, the shape of the inner face of the die corresponds to the shape of the expansion portion obtained using this die shape, so by setting the shape of the inner face of the die, the expansion portion can be freely formed with a desirable shape.

In order to confer a pressure difference between the pressure inside the insulating sheath and the pressure outside the insulating sheath within the die, the inside of the die may be evacuated to reduce pressure, or a gas such as air may be injected into the insulating sheath during heating within the die from at least one end of the flat cable material. In the former case, it is possible to form a desired expansion portion without using a special pressurizing gas.

The invention claimed is:

1. A flat cable, comprising:
    a plurality of conductors respectively extending in an axial direction; and
    an insulating sheath configured to, in a state where the conductors are lined up in a width direction orthogonal to the axial direction of the conductors, restrict the conductors from outside and collectively cover the conductors,
    wherein the insulating sheath has an expander enabling bending in the width direction by permitting relative displacement between the conductors, and the expander, by expanding so as to partially separate from the conductors in at least a thickness direction orthogonal to both the width direction and the axial direction, forms an internal space permitting relative displacement such that adjacent conductors overlap in the thickness direction.

2. The flat cable according to claim 1,
    wherein the expander further expands so as to separate to the outside in the width direction from an outer circumferential face of outer conductors of the conductors positioned at both outer sides in the width direction.

3. The flat cable according to claim 1,
    wherein the expander has a bellows-like shape with a mountain portion configured to expand to the outside, and a valley portion having a smaller outer diameter than an outer diameter of the mountain portion and an inner diameter smaller than an inner diameter of the mountain portion, alternately lined up.

4. The flat cable according to claim 2,
    wherein the expander has a bellows-like shape with a mountain portion configured to expand to the outside, and a valley portion having a smaller outer diameter than an outer diameter of the mountain portion and an inner diameter smaller than an inner diameter of the mountain portion, alternately lined up.

* * * * *